Oct. 4, 1932.  A. B. CASPER  1,880,797
SHOCK ABSORBER
Filed Aug. 17, 1929  2 Sheets-Sheet 2
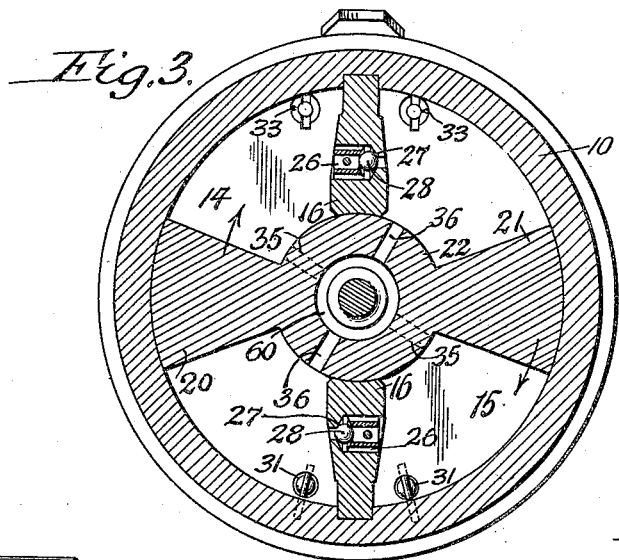
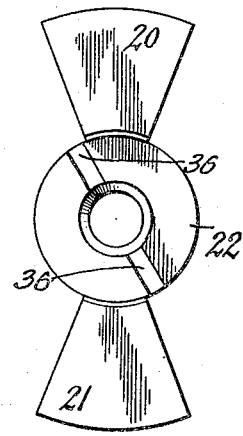
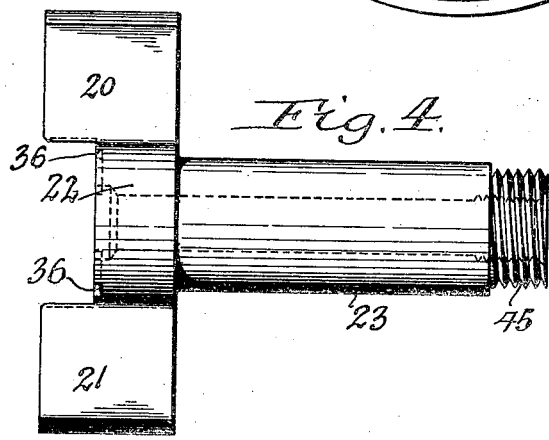
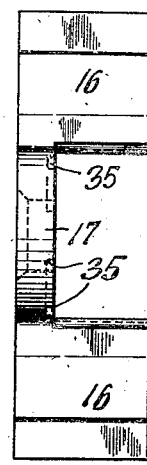
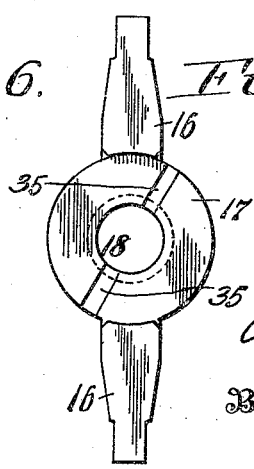
Inventor
Anthony B. Casper
By Popp & Powers
Attorneys Patented Oct. 4, 1932

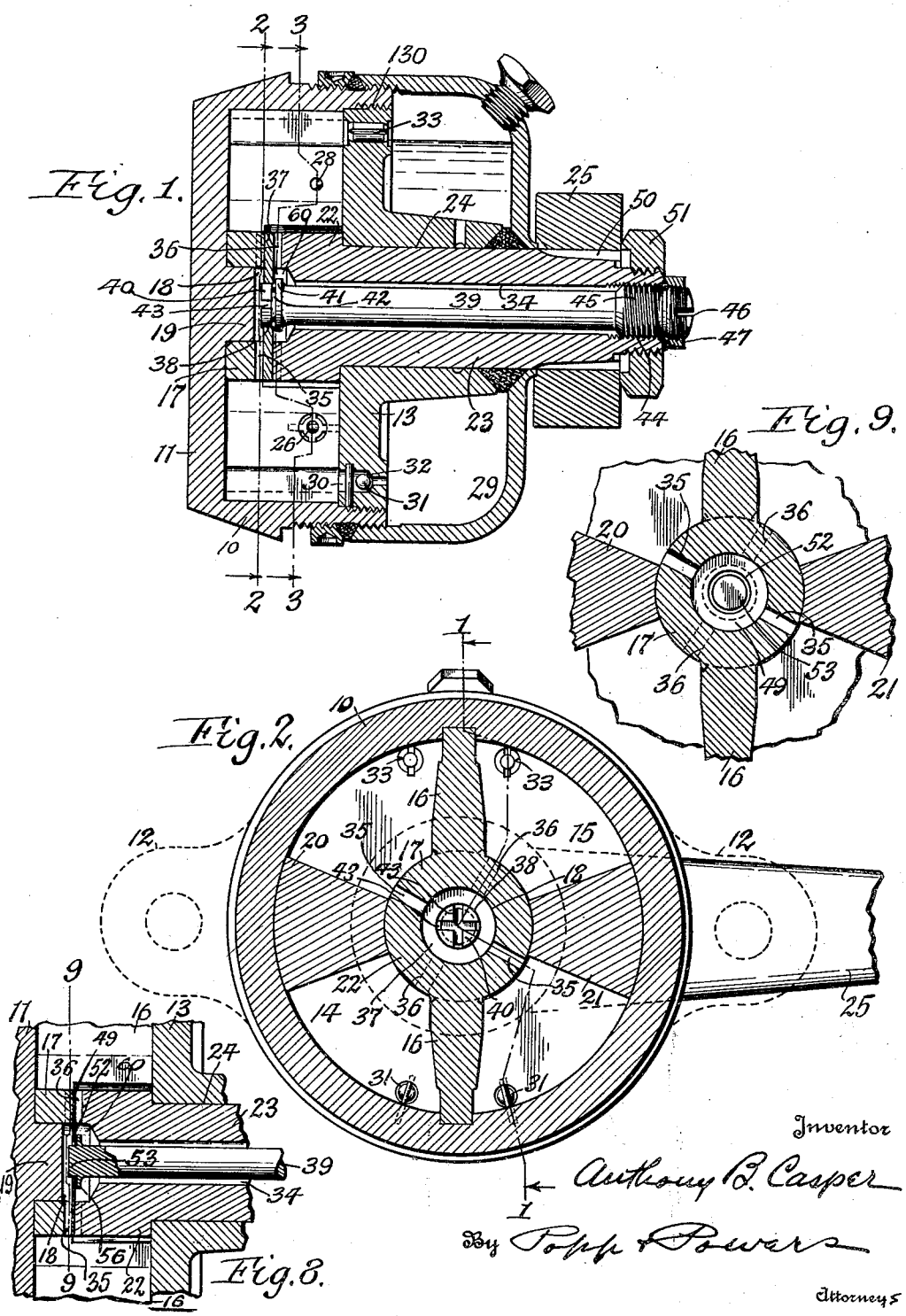

1,880,797

UNITED STATES PATENT OFFICE

ANTHONY B. CASPER, OF BUFFALO, NEW YORK, ASSIGNOR TO HONDE ENGINEERING CORPORATION, OF BUFFALO, NEW YORK, A CORPORATION OF NEW YORK

SHOCK ABSORBER

Application filed August 17, 1929. Serial No. 386,591.

This invention relates to a hydraulic shock absorber of the Houdaille type as shown in U. S. Letters Patent No. 1,627,810 May 10, 1927 and the object of the present invention is to provide an improvement in the valve mechanism whereby the flow of the liquid resistance medium back and forth between the high and lower pressure ends of the working chambers are simplified in construction so as to reduce the cost of manufacture and also to permit the capacity of this by-pass to be adjusted both manually and automatically for adapting the shock absorber to differences in the viscosity of the liquid which is used as the resistance medium under different temperature conditions.

In the accompanying drawings:

Figure 1 is a longitudinal section of a hydraulic shock absorber embodying one form of my invention.

Figures 2 and 3 are transverse sections taken on the correspondingly numbered lines in Fig. 1.

Figure 4 is a side elevation of the rock shaft and the pistons or wings mounted thereon and constructed in accordance with my improvements.

Figure 5 is an end view of the same.

Figure 6 is a side view of the partition containing part of my invention.

Figure 7 is an end view of the same.

Figure 8 is a fragmentary longitudinal section showing a slightly modified form of my invention as compared with that shown in Fig. 1.

Figure 9 is a cross section taken on line 9—9 Fig. 8.

In the following description similar characters of reference indicate like parts in the several figures of the drawings.

This shock absorber is provided with a hollow cylindrical body consisting preferably of a cylindrical peripheral wall 10, a rear head 11 formed integrally with the peripheral wall at the rear end thereof and provided with lugs 12 adapted to be connected with one of two relatively movable parts such as the frame of an automobile, and a front wall 13 connected at its edge with the front end of the peripheral wall by a screw joint 130.

The interior of this cylindrical body is divided into two segmental working chambers 14, 15 by a sectional partition having its sections 16, 16 arranged diametrically within the outer part of the body and their inner ends connected by a circular collar 17. The latter is provided centrally with an axial opening 18, the rear part of which receives a centering or pilot pin 19 projecting forwardly from the rear wall of the body while the front part of this opening is vacant to form part of a liquid by-pass between the working chambers as will presently appear.

Two working pistons or wings 20, 21 oscillate within these working chambers, the inner ends of these pistons being connected by a circular hub 22 which engages its periphery with the inner edges of the partition sections while its front end engages with the inner or rear side of the front body wall 13, as shown in Fig. 1. The hub 22 is formed on the rear or inner end of a rock shaft 23 which is journaled in a bearing 24 on the central part of the wall 13 and has its external front end connected with a rock arm 25 which is connected with the other relatively movable part, such for example as the axle of an automobile upon which the frame of the car is mounted by means of a spring system. This arm is compelled to turn with the shaft by serrations 50 and held against forward movement thereon by a clamping screw nut 51, as shown in Fig. 1.

The working chambers of the body are filled with a resistance liquid, such as oil, and during the low pressure strokes of the pistons this liquid is permitted to pass with comparative freedom from the low pressure end of each working chamber to the high pressure end of the companion chamber by a check valve controlled passage consisting preferably of a port 26 arranged in each partition section and provided with a valve seat 27 facing the high pressure end of the respective chamber, and a ball check valve 28 movable toward and from this valve seat.

In front of the body is arranged a replenishing chamber or reservoir 29 which is adapted to contain a reserve supply of resistance liquid and from the lower end of which this liquid is delivered to the lower ends of the working chambers through one or more replenishing ports 30 in the lower part of the wall 13, and each controlled by a check valve 31 which is arranged in the respective port 30 and movable toward and from a valve seat 32 therein which faces the respective working chamber, as shown in Fig. 1. Air is permitted to escape from the upper ends of the working chambers into the upper end of the replenishing chamber by vents 33 arranged in the wall 13 at the upper ends of these chambers.

For the purpose of regulating the cushioning effect of the resistance liquid in the shock absorber in accordance with the load imposed on the same and other variable conditions, valve controlled by-pass means are provided which permit the resistance liquid to flow back and forth between the several ends of the working chambers independently of the check valves in the partition sections which by-pass valve means are constructed as follows:—

The numeral 34 represents a longitudinal bore formed in the shaft and hub of the pistons and having its inner or rear end enlarged to form a circular valve chamber 60 which is arranged opposite the pocket or recess formed by the front end of the opening 18 in the collar 17 forming an integral part of the partitions 16. On its front face the collar 17 is provided with two radial grooves 35, 35 extending radially from its central opening 18 to the periphery of this collar adjacent to and connecting the high pressure sides of the respective partition sections; and on the rear face of the piston hub at a distance from the grooves 35, 35 are formed with two grooves 36, 36 extending radially from the central valve chamber 60 to the periphery of the hub adjacent to the low pressure sides of the pistons.

The numeral 37 represents a valve seat disk which is arranged between the collar of the partition sections and the hub of the pistons and bears with its peripheral edge against the inner edges of the partition sections while its front side bears against the rear end of the hub and its rear side bears against the front side of the collar. In its central part the disk is provided with a circular valve port 38 which connects the opening 18 in the collar with the valve chamber 60 in the hub. In this manner the disk cooperates with the collar and hub to form inter-communicating passages or by-passes between the high and low pressure ends of the working chambers on opposite sides of the partition sections and the pistons through which the resistance liquid can pass back and forth in regulated quantity during both the low and high pressure strokes of the pistons and thus prevents the formation of dead liquid resistance at any time but instead offers a yielding resistance whereby shock is absorbed in accordance with the intensity of the same.

For the purpose of regulating the flow of the resistance liquid through the by-passes to suit different loads and conditions means are provided for adjusting the capacity of this by-pass. This adjustment is effected by valve device whereby the capacity of the port in the disk may be varied and in the form shown in Figs. 1, 2 and 3 the valve device includes a longitudinally movable valve stem 39 arranged lengthwise in the bore of the shaft and provided at its inner or rear end with a valve plug 40 arranged in the port 38 and an annular valve flange 41 arranged on the stem in front of the valve disk. The valve stem is provided with an annular groove or channel 42 between said plug and flange, the inner end of the valve plug has a plurality of radial grooves or recesses 43 and the outer ends of the latter are connected with said annular channel or groove 42.

As the pistons oscillate in the working chambers some of the resistance liquid is pushed back and forth through the by-passages, and through the grooves, channels and notches of the inner part of the valve stem which is arranged in the port of the valve disk. The metered volume of liquid capable of passing back and forth in this manner is governed by the distance between the valve flange of the valve stem and the front side of the valve disk so that by adjusting the valve stem lengthwise the valve flange 41 may be brought either closer to the valve disk or farther from the same and thereby either reduce or increase the volume of liquid which can traverse the by-passages.

Although various means may be employed for effecting longitudinal adjustment of the valve stem this, as shown in the drawings, is preferably accomplished by a screw thread 45 on the outer end portion of the valve stem engaging with an internal screw thread 44 in the outer end of the bore in the shaft so that by turning the valve stem its valve flange will be moved toward or from the outer face of the valve disk and produce a corresponding adjustment or metering of the liquid capacity of the by-passes. Turning of the valve stem is preferably effected by applying a screw driver into a notch 46 in the outer end of the valve stem. To prevent oil leaking outwardly past the valve stem a screw threaded clamping nut 47 is applied to the threaded outer end of the valve stem and engaged on its inner side with a packing ring 48 resting against the outer end of the shaft, said packing nut also serving to hold the valve stem in its adjusted position.

If desired the valve disk, as shown in Fig. 1, may be made comparatively thick or heavy so that the same is inflexible and not yieldable under the pressure of the resistance liquid which is brought against the same, whereby the capacity of the port and by-passes always remains the same for a certain position of the valve stem.

If desired the shock absorber may be so organized that the capacity of the liquid by-pass is automatically increased when an abnormally great resistance is encountered, as for example, when in cold weather the resistance liquid congeals or thickens somewhat and becomes less viscous and therefore flows less freely. In order to automatically take care of this condition the valve disk, as shown at 49 in Figs. 8 and 9, is made of flexible material such as thin spring metal, this disk having a central port 52 into which projects a valve plug 53 at the inner end of the valve stem 39, the latter also having an annular valve flange 56 which can be spaced at different distances from the front side of the valve disk 49 by adjusting the stem manually in the manner shown in Fig. 1.

Under normal conditions when the weather is warm and the resistance liquid comparatively thin or free flowing, the same will pass back and forth through the port 52 of the flexible valve disk under the pressure of the pistons without deflecting this disk and thus leave the port in the center thereof of substantially uniform size and capacity. If, however, the liquid has congealed, thickened or become more viscous, as would be liable to occur in winter time, then the liquid flows less freely and consequently offers greater resistance.

At such times the inner edge portion of the flexible valve disk which in effect constitutes a valve seat, is deflected by the abnormally high pressure of the resistance liquid and produces a flared enlargement of the port therein from the high pressure toward the low pressure side thereof during a high pressure stroke of the pistons. When the valve disk is thus deflected and the port therein enlarged the metering capacity of the by-pass is increased so that the resistance liquid can flow with greater freedom, thereby avoiding unduly high resistance and ensuring easy riding of the car during the high pressure strokes of the pistons while the spring system is rebounding.

When the abnormal pressure is removed from the flexible valve disk during high pressure strokes of the pistons, the disk, due to its resilience, will be restored to its normal condition in which the metal around the port thereof is not deflected and remains in this position while the liquid is of normal fluidity.

When the absorber is provided with an inflexible disk 37 as shown in Figs. 1 and 2 the body 10 and operating arm 25 of the absorber are preferably so mounted on the relatively movable parts that during the high pressure stroke of the pistons as indicated by the arrows in Fig. 3 the liquid will be pushed from the high pressure ends of the working chambers successively through the passages 35, pocket 18, port 38, valve chamber 60 and passages 36 into the low pressure ends of the working chamber, whereby a comparatively low pressure will be produced in the bore 34 and the packing 48 can be more readily held tight to avoid leakage of resistance liquid to the exterior of the instrument.

When using the construction shown in Figs. 8 and 9 the body and operating arm must be mounted on the relatively movable parts that the resistance fluid during a working or high pressure stroke is pushed by the pistons from the high pressure ends of the working chambers successively through the passages 36, valve chamber 60, port 52 and passages 35 into the low pressure ends of the working chambers in which case, however, the packing 48 is exposed to higher pressure and care must be taken to keep the same leak-tight.

I claim as my invention:—

1. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, and a valve disk arranged between the opposing inner sides of said collar and hub and extending over the grooves thereof and provided centrally with a port which communicates with the central openings of said collar and hub.

2. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, and a valve disk arranged between the opposing inner sides of said collar and hub and extending over the grooves thereof and provided centrally with a port which communicates with the central openings of said collar and hub, said disk being constructed of flexible material and the inner edge of the same being adapted to be flexed by abnormal pressures of the resistance fluid during high pressure strokes of the pistons so as to enlarge the port and permit the resistance liquid to flow more freely at such times.

3. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, a valve disk arranged between the opposing inner sides of said collar and hub and extending over the grooves thereof and provided centrally with a port which communicates with the central openings of said collar and hub, and a valve closure movable toward and from the port in said disk for regulating the capacity of the same.

4. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, a valve disk arranged between the opposing inner sides of said collar and hub and extending over the grooves thereof and provided centrally with a port which communicates with the central openings of said collar and hub, a rock shaft journaled in a bearing on the casing and carrying said hub, and said shaft and hub having a longitudinal bore, and a valve stem adjustable lengthwise in the bore of said shaft and hub and provided at its inner end with a regulating valve closure which is movable toward and from said port for varying the capacity of the same.

5. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, a valve disk arranged between the opposing inner sides of said collar and hub and extending over the grooves thereof and provided centrally with a port which communicates with the central openings of said collar and hub, a rock shaft journaled in a bearing on the casing and carrying said hub, and said shaft and hub having a longitudinal bore, a valve stem arranged lengthwise in said shaft and having its outer end connected therewith by a screw joint and its inner end provided with a valve closure movable toward and from said port for varying the capacity of the latter.

6. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, a valve disk arranged between the opposing inner sides of said collar and hub and extending over the grooves thereof and provided centrally with a port which communicates with the central openings of said collar and hub, and a valve closure arranged adjacent to said port, said disk being flexible and adapted to have the edge of its port flexed under abnormal pressure away from said closure for automatically increasing the capacity of the same during high pressure strokes of the pistons.

7. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sites of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, a valve disk arranged between the opposing inner sides of said collar and hub and extending over the grooves thereof and provided centrally with a port which communicates with the central openings of said collar and hub, and a valve device adjustable manually toward and from said port for regulating the flow of liquid through the same, said disk being flexible and adapted to have its port edge automatically flexed away from said valve device by abnormal pressure of the liquid during high pressure strokes of the pistons and thereby adapt the absorber to different temperature conditions affecting the viscosity of the resistance liquid.

8. A shock absorber comprising a hollow cylindrical casing, partition sections extending across the interior of said casing and dividing the same into two working chambers and provided centrally with a circular collar having an axial opening and radial grooves on its inner side which extend from said opening to said working chambers on opposite sides of said partition sections, pistons movable back and forth in said working chambers and provided centrally with a circular hub which is arranged opposite the collar of said partition sections and is provided centrally with an opening and on its inner side with radial grooves extending from the central opening in the hub to the periphery thereof on opposite sides of the pistons, a valve disk arranged between the opposing inner sides of said collar and hub and extending over the grooves thereof and provided centrally with a port which communicates with the central openings of said collar and hub, a valve device adjustable manually toward and from said port for regulating the flow of liquid through the same, said disk being flexible and adapted to have its port edge automatically flexed away from said valve device by abnormal pressure of the liquid during high pressure strokes of the pistons and thereby adapt the absorber to different temperature conditions affecting the viscosity of the resistance liquid, said valve device including a valve stem adjustable lengthwise in said shaft, a plug arranged on the inner end of said stem and projecting into said port and provided on its end with radial grooves and an annular closure flange arranged on the stem and movable toward and from the front side of said disk and separated from said plug by an annular groove which communicates with the outer ends of said radial grooves.

9. A shock absorber comprising a working chamber adapted to contain a resistance liquid, a piston movable back and forth in said chamber and having a hub, and by-pass means providing communication between opposite ends of said chamber and including a groove arranged in the end of said hub and opening into said chamber, and a disk engaging the end of said hub and extending over said groove to form a conduit therewith.

10. A shock absorber comprising a working chamber adapted to contain a resistance liquid, a piston movable back and forth in said chamber and having a hub, a collar arranged opposite the end of said hub, said collar and hub being provided on their opposing sides with grooves leading to said working chamber on opposite sides of said piston; and a disk arranged between said collar and hub and extending over the grooves thereof.

11. A shock absorber comprising a working chamber adapted to contain a resistance liquid, a piston movable back and forth in said chamber and having a hub, a collar arranged opposite the end of said hub, said collar and hub being provided respectively with central openings and grooves leading from the central openings to the periphery of the collar and hub on opposite sides of said piston, a disk arranged between the opposing sides of said collar and hub and provided centrally with a port, and a valve closure for controlling the capacity of said port.

12. A shock absorber comprising a hollow cylindrical casing for containing resistance fluid, a partition at the interior of said casing dividing the same into two working chambers, a shaft extending into said casing and supporting pistons in said casing movable back and forth in said working chambers, there being a valve chamber between the inner end of said shaft and said partition, a valve seat in the form of a disk interposed between the inner end of said shaft and said partition and bisecting said valve chamber, said valve chamber on one side of said disk communicating with one of said working chambers and said valve chamber on the opposite side of said disk communicating with said other working chamber, said valve disk having a port therethrough, and an adjustable valve extending through said shaft for cooperation with said port to control the flow of fluid from one of said working chambers to the other by way of said port during relative rotation of said casing and shaft.

13. A hydraulic shock absorber comprising a working chamber adapted to contain resistance liquid, a piston movable back and forth in said chamber, a bypass providing communication between opposite ends of said chamber, a disk having a port interposed in said bypass, a valve cooperating with said port for the flow of liquid therethrough at a predetermined rate under normal pressure, said disk being secured at its edges and free to flex to shift said port relative to said valve under abnormal pressure to thereby increase the rate of flow.

In testimony whereof I hereby affix my signature.

ANTHONY B. CASPER.

CERTIFICATE OF CORRECTION.

Patent No. 1,880,797.  October 4, 1932.

ANTHONY B. CASPER.

It is hereby certified that the name of the assignee in the above numbered patent was erroneously described and specified as "Honde Engineering Corporation", whereas said name should have been described and specified as 'Houde Engineering Corporation", as shown by the records of assignments in this office; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.